(12) United States Patent
Gonzales et al.

(10) Patent No.: US 12,380,565 B2
(45) Date of Patent: Aug. 5, 2025

(54) SYSTEMS AND METHODS FOR PRECISE ANOMALY LOCALIZATION WITHIN CONTENT CAPTURED BY A MACHINE VISION CAMERA

(71) Applicant: ZEBRA TECHNOLOGIES CORPORATION, Lincolnshire, IL (US)

(72) Inventors: Daniel S. Gonzales, Aurora, IL (US); Yan Zhang, Buffalo Grove, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 642 days.

(21) Appl. No.: 17/490,857

(22) Filed: Sep. 30, 2021

(65) Prior Publication Data

US 2023/0095647 A1 Mar. 30, 2023

(51) Int. Cl.
*G06T 7/11* (2017.01)
*G06N 3/0455* (2023.01)
(Continued)

(52) U.S. Cl.
CPC .............. *G06T 7/11* (2017.01); *G06N 3/0455* (2023.01); *G06N 3/0464* (2023.01); *G06N 3/088* (2013.01);
(Continued)

(58) Field of Classification Search
CPC ...................... G06T 7/11; G06T 7/0004; G06T 2207/20081; G06T 2207/20084;
(Continued)

(56) References Cited

U.S. PATENT DOCUMENTS 10,849,585 B1 * 12/2020 Teixeira ................. A61B 5/055
10,956,808 B1 * 3/2021 Bhardwaj .............. G06N 3/045
(Continued)

FOREIGN PATENT DOCUMENTS

WO WO-2016060815 A1 * 4/2016 ............. G02C 11/10
WO WO-2019026081 A2 * 2/2019 ......... G06F 18/2415

OTHER PUBLICATIONS

International Search Report and Written Opinion for International Application No. PCT/US2022/38659 mailed on Dec. 2, 2022.

*Primary Examiner* — Roberto Velez
*Assistant Examiner* — Daniella M. DiGuglielmo

(57) ABSTRACT

Systems and methods for anomaly localization within content captured by a machine vision camera are disclosed herein. An example method includes receiving, at an application executed on a user computing device communicatively coupled to a machine vision camera, an image captured by the machine vision camera, the image including a target object with one or more localized anomalies. The example method further includes generating, by applying an unsupervised anomaly detection (UAD) module to the image, an anomaly heatmap corresponding to the image; and concatenating, by a concatenation module, the image and the anomaly heatmap into a multi-channel image. The example method also includes generating, by applying a supervised segmentation (SS) module to the multi-channel image, a hybrid output mask identifying the one or more localized anomalies within the image.

20 Claims, 8 Drawing Sheets

(51) Int. Cl.
  *G06N 3/0464*   (2023.01)
  *G06N 3/047*    (2023.01)
  *G06N 3/088*    (2023.01)
  *G06N 3/09*     (2023.01)
  *G06N 5/01*     (2023.01)
  *G06N 7/01*     (2023.01)
  *G06N 20/10*    (2019.01)
  *G06N 20/20*    (2019.01)
  *G06T 7/00*     (2017.01)

(52) U.S. Cl.
  CPC ............. *G06N 3/09* (2023.01); *G06T 7/0004* (2013.01); *G06N 3/047* (2023.01); *G06N 5/01* (2023.01); *G06N 7/01* (2023.01); *G06N 20/10* (2019.01); *G06N 20/20* (2019.01); *G06T 2207/20081* (2013.01); *G06T 2207/20084* (2013.01)

(58) Field of Classification Search
  CPC   G06N 3/088; G06N 5/01; G06N 7/01; G06N 20/10; G06N 20/20; G06N 3/0455; G06N 3/0464; G06N 3/047; G06N 3/09
  See application file for complete search history.

(56)  References Cited

U.S. PATENT DOCUMENTS

2018/0160933 A1*   6/2018  Urman ................. A61N 1/0476
  2020/0357117 A1*  11/2020  Lyman .................. G06T 7/0012
  2022/0244194 A1*   8/2022  Perron ............... G01N 21/8851

* cited by examiner

SYSTEMS AND METHODS FOR PRECISE ANOMALY LOCALIZATION WITHIN CONTENT CAPTURED BY A MACHINE VISION CAMERA

BACKGROUND

Over the years, industrial automation has come to rely heavily on machine vision components capable of assisting operators in a wide variety of tasks. In some implementations, machine vision components, like cameras, are utilized to track passing objects, like those which move on conveyor belts past stationary cameras. Often these cameras, along with the backend software, are used to capture images and determine a variety of parameters associated with the passing items. One aspect of this requires the machine vision cameras and/or the backend software to accurately and consistently localize anomalies within images of objects captured by the cameras. Thus, there exists a need for improved systems and methods that provide such features.

SUMMARY

In an embodiment, the present invention is a method for anomaly localization within content captured by a machine vision camera. The method may comprise: receiving, at an application executed on a user computing device communicatively coupled to a machine vision camera, an image captured by the machine vision camera, the image including a target object with one or more localized anomalies; generating, by applying an unsupervised anomaly detection (UAD) module to the image, an anomaly heatmap corresponding to the image; concatenating, by a concatenation module, the image and the anomaly heatmap into a multi-channel image; and generating, by applying a supervised segmentation (SS) module to the multi-channel image, a hybrid output mask identifying the one or more localized anomalies within the image.

In a variation of this embodiment, the UAD module includes an unsupervised machine learning model that is trained with a plurality of training images each including a training target object with no localized anomalies. Further in this variation, the unsupervised machine learning model includes a convolutional autoencoder.

In another variation of this embodiment, the image is a red-green-blue (RGB) image, and the anomaly heatmap is a single channel image. Further, concatenating the image and the anomaly heatmap further comprises: concatenating, by the concatenation module, the image and the anomaly heatmap into a 4-channel image.

In yet another variation of this embodiment, the SS module includes a supervised machine learning model that is trained with (i) a plurality of multi-channel images and (ii) a plurality of ground-truth binary masks, wherein each respective ground-truth binary mask corresponds to a respective multi-channel image. Further in this variation, the supervised machine learning model includes a convolutional neural network (CNN).

In still another variation of this embodiment, the method further comprises: displaying, on a user interface, the hybrid output mask for viewing by a user.

In another embodiment, the present invention is a machine vision system for anomaly localization within content captured by a machine vision camera. The machine vision system may comprise: a machine vision camera configured to capture an image including a target object with one or more localized anomalies; and a user computing device executing an application. The user computing device is communicatively coupled to the machine vision camera and is configured to: receive the image captured by the machine vision camera; generate, by applying an unsupervised anomaly detection (UAD) module to the image, an anomaly heatmap corresponding to the image; concatenate, by a concatenation module, the image and the anomaly heatmap into a multi-channel image; and generate, by applying a supervised segmentation (SS) module to the multi-channel image, a hybrid output mask identifying the one or more localized anomalies within the image.

In a variation of this embodiment, the UAD module includes an unsupervised machine learning model that is trained with a plurality of training images each including a training target object with no localized anomalies. Further in this variation, the unsupervised machine learning model includes a convolutional autoencoder.

In another variation of this embodiment, the image is a red-green-blue (RGB) image, and the anomaly heatmap is a single channel image. Further, the user computing device is further configured to: concatenate, by the concatenation module, the image and the anomaly heatmap into a 4-channel image.

In yet another variation of this embodiment, the SS module includes a supervised machine learning model that is trained with (i) a plurality of multi-channel images and (ii) a plurality of ground-truth binary masks, wherein each respective ground-truth binary mask corresponds to a respective multi-channel image. Further in this variation, the supervised machine learning model includes a convolutional neural network (CNN).

In still another variation of this embodiment, the user computing device is further configured to: display, on a user interface, the hybrid output mask for viewing by a user.

In yet another embodiment, the present invention is a tangible machine-readable medium. The tangible machine-readable medium comprises instructions that, when executed, cause a machine to at least: receive, an image captured by a machine vision camera, the image including a target object with one or more localized anomalies; generate, by applying an unsupervised anomaly detection (UAD) module to the image, an anomaly heatmap corresponding to the image; concatenate, by a concatenation module, the image and the anomaly heatmap into a multi-channel image; and generate, by applying a supervised segmentation (SS) module to the multi-channel image, a hybrid output mask identifying the one or more localized anomalies within the image.

In a variation of this embodiment, the UAD module includes an unsupervised machine learning model that is trained with a plurality of training images each including a training target object with no localized anomalies. Further in this variation, the unsupervised machine learning model includes a convolutional autoencoder.

In another variation of this embodiment, the image is a red-green-blue (RGB) image, and the anomaly heatmap is a single channel image. Further, the instructions, when executed, further cause the machine to at least: concatenate, by the concatenation module, the image and the anomaly heatmap into a 4-channel image.

In yet another variation of this embodiment, the SS module includes a supervised machine learning model that is trained with (i) a plurality of multi-channel images and (ii) a plurality of ground-truth binary masks, wherein each respective ground-truth binary mask corresponds to a respective multi-channel image. Further in this variation, the supervised machine learning model includes a convolutional neural network (CNN).

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
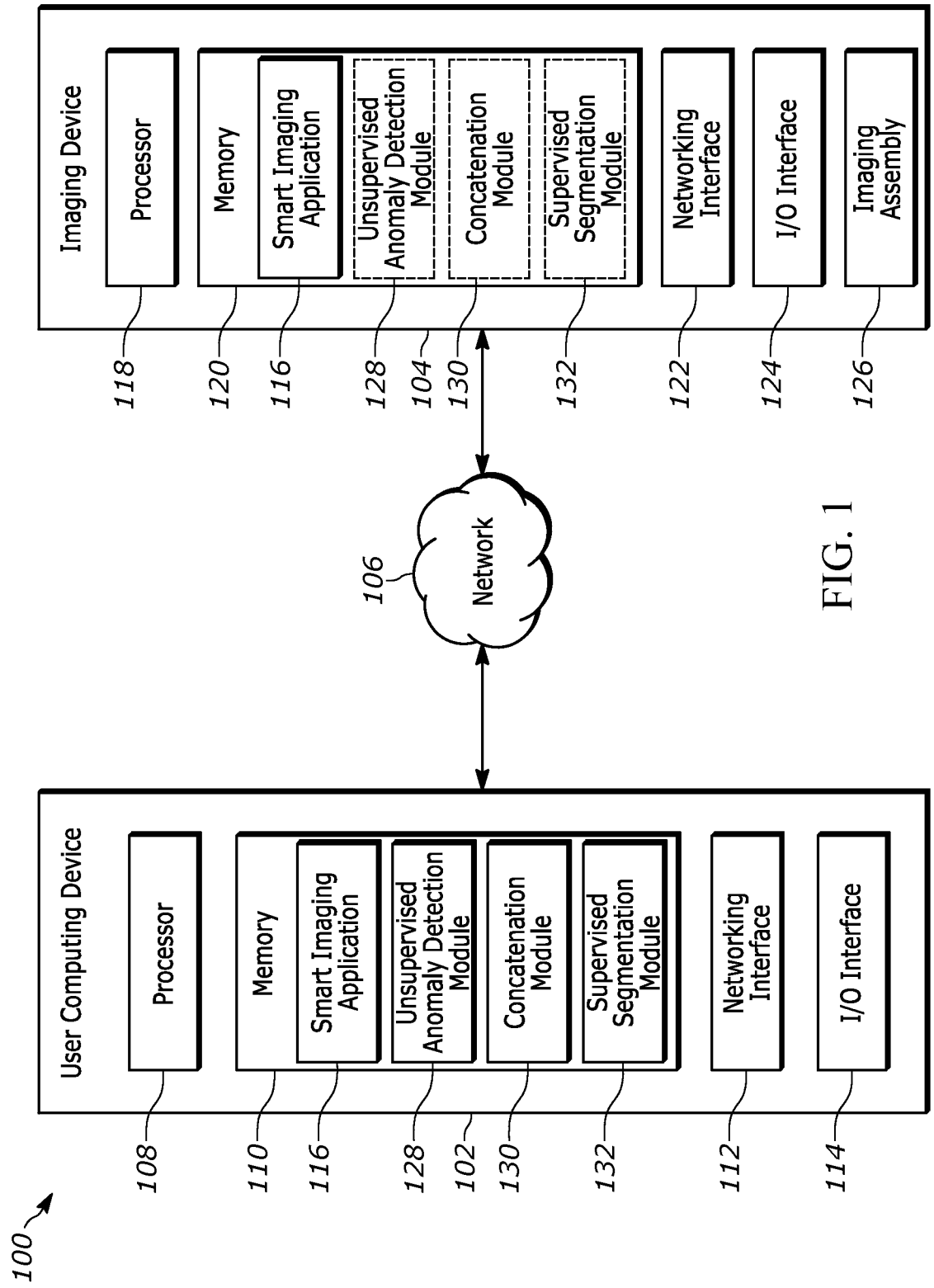
FIG. 1 is an example system configured for anomaly localization within content captured by a machine vision camera, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Machine vision system owners/operators, particularly in industrial settings, generally have a need to determine whether or not each object passing the machine vision cameras, and/or otherwise included in an image captured by the machine vision cameras, includes a defect/anomaly. Thus, there arises a need to accurately, consistently, and efficiently make this determination based on the captured images from the machine vision cameras. Typically, this is difficult to accomplish in an automatic manner, because the conventional recognition algorithms are incapable of recognizing anomalies on both (i) objects featuring high variation (e.g., tile/wood surfaces) and (ii) objects with missing part defects (e.g., missing screw thread, missing brush bristles). Approaches described herein address these difficulties and provide a solution which helps improve the accuracy, consistency, and efficiency of the anomaly detection process.

Generally speaking, supervised machine learning models excel at identifying/localizing anomalies on objects featuring high variation and/or background noise, but may struggle performing anomaly identification/localization on objects with missing part defects. Conversely, unsupervised machine learning models excel at identifying/localizing anomalies on objects with missing part defects, but may struggle performing anomaly identification/localization on objects featuring high variation. The techniques described herein provide a hybrid model for anomaly detection/localization that utilizes both supervised and unsupervised machine learning models to accurately provide classifications (e.g., good, defective) for entire objects as well as locating defective areas on the objects. Specifically, the techniques of the present disclosure combine supervised and unsupervised machine learning models in order to leverage the advantages of both machine learning model types while minimizing the respective weaknesses. As a result, the techniques of the present disclosure accurately and consistently identify/localize anomalies on objects with missing part defects and objects featuring high variation to a degree that is unattainable with either individual machine learning model type alone.

Thus, the techniques of the present disclosure improve over conventional systems at least by utilizing both supervised and unsupervised machine learning models in a manner that accurately, efficiently, and consistently performs anomaly detection on images of target objects featuring a wide variety of defects that was previously unachievable by the conventional systems. Moreover, as a result of the techniques of the present disclosure, machine vision system owners/operators receive high quality defect identification and localization that provides valuable insight corresponding to the root causes of quality issues arising in manufacturing and/or other processes. Thus, the machine vision system owners/operators may act to quickly resolve these quality issues, thereby increasing manufacturing uptime and overall efficiency.

FIG. 1 is an example system 100 configured for anomaly localization within content captured by a machine vision camera, in accordance with various embodiments disclosed herein. In the example embodiment of FIG. 1, the imaging system 100 includes a user computing device 102 and an imaging device 104 communicatively coupled to the user computing device 102 via a network 106. Generally speaking, the user computing device 102 and the imaging device 104 may be capable of executing instructions to, for example, implement operations of the example methods described herein, as may be represented by the flowcharts of the drawings that accompany this description. The user computing device 102 is generally configured to enable a user/operator to create a machine vision job for execution on the imaging device 104. When created, the user/operator may then transmit/upload the machine vision job to the imaging device 104 via the network 106, where the machine vision job is then interpreted and executed. The user computing device 102 may comprise one or more operator workstations, and may include one or more processors 108, one or more memories 110, a networking interface 112, an input/output (I/O) interface 114, a smart imaging application 116, an unsupervised anomaly detection (UAD) module 128, a concatenation module 130, and a supervised segmentation (SS) module 132. It is to be understood, that a "machine vision job" as referenced herein may be or include any suitable imaging job including any suitable executable tasks, such as machine vision tasks, anomaly detection/localization tasks, barcode decoding tasks, and/or any other tasks or combinations thereof.

The imaging device 104 is connected to the user computing device 102 via a network 106, and is configured to interpret and execute machine vision jobs received from the user computing device 102. Generally, the imaging device 104 may obtain a job file containing one or more job scripts from the user computing device 102 across the network 106 that may define the machine vision job and may configure the imaging device 104 to capture and/or analyze images in accordance with the machine vision job. For example, the imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture an image of the target object in accordance with the configuration established via the one or more job scripts. Once captured and/or analyzed, the imaging device 104 may transmit the images and any associated data across the network 106 to the user computing device 102 for further analysis and/or storage. In various embodiments, the imaging device 104 may be a "smart" camera and/or may otherwise be configured to automatically perform sufficient functionality of the imaging device 104 in order to obtain, interpret, and execute job scripts that define machine vision jobs, such as any one or more job scripts contained in one or more job files as obtained, for example, from the user computing device 102.

Broadly, the job file may be a JSON representation/data format of the one or more job scripts transferrable from the user computing device 102 to the imaging device 104. The job file may further be loadable/readable by a C++ runtime engine, or other suitable runtime engine, executing on the imaging device 104. Moreover, the imaging device 104 may run a server (not shown) configured to listen for and receive job files across the network 106 from the user computing device 102. Additionally, or alternatively, the server configured to listen for and receive job files may be implemented as one or more cloud-based servers, such as a cloud-based computing platform. For example, the server may be any one or more cloud-based platform(s) such as MICROSOFT AZURE, AMAZON AWS, or the like.

In any event, the imaging device 104 may include one or more processors 118, one or more memories 120, a networking interface 122, an I/O interface 124, and an imaging assembly 126. The imaging assembly 126 may include a digital camera and/or digital video camera for capturing or taking digital images and/or frames. Each digital image may comprise pixel data that may be analyzed by one or more tools each configured to perform an image analysis task. The digital camera and/or digital video camera of, e.g., the imaging assembly 126 may be configured, as disclosed herein, to take, capture, or otherwise generate digital images and, at least in some embodiments, may store such images in a memory (e.g., one or more memories 110, 120) of a respective device (e.g., user computing device 102, imaging device 104).

For example, the imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various embodiments, the imaging assembly 126 may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data.

In embodiments, imaging assembly 126 may be configured to capture images of surfaces or areas of a predefined search space or target objects within the predefined search space. For example, each tool included in a job script may additionally include a region of interest (ROI) corresponding to a specific region or a target object imaged by the imaging assembly 126. The composite area defined by the ROIs for all tools included in a particular job script may thereby define the predefined search space which the imaging assembly 126 may capture in order to facilitate the execution of the job script. However, the predefined search space may be user-specified to include a field of view (FOV) featuring more or less than the composite area defined by the ROIs of all tools included in the particular job script. It should be noted that the imaging assembly 126 may capture 2D and/or 3D image data/datasets of a variety of areas, such that additional areas in addition to the predefined search spaces are contemplated herein. Moreover, in various embodiments, the imaging assembly 126 may be configured to capture other sets of image data in addition to the 2D/3D image data, such as grayscale image data or amplitude image data, each of which may be depth-aligned with the 2D/3D image data.

The imaging device 104 may also process the 2D image data/datasets and/or 3D image datasets for use by other devices (e.g., the user computing device 102, an external server). For example, the one or more processors 118 may process the image data or datasets captured, scanned, or sensed by the imaging assembly 126. The processing of the image data may generate post-imaging data that may include metadata, simplified data, normalized data, result data, status data, or alert data as determined from the original scanned or sensed image data. The image data and/or the post-imaging data may be sent to the user computing device 102 executing the smart imaging application 116 for viewing, manipulation, and/or otherwise interaction. In other embodiments, the image data and/or the post-imaging data may be sent to a server for storage or for further manipulation. As described herein, the user computing device 102, imaging device 104, and/or external server or other centralized processing unit and/or storage may store such data, and may also send the image data and/or the post-imaging data to another application implemented on a user device, such as a mobile device, a tablet, a handheld device, or a desktop device.

Each of the one or more memories 110, 120 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., smart imaging application 116, unsupervised anomaly detection module 128, concatenation module 130, supervised segmentation module 132, and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118 (e.g., working in connection with the respective operating system in the one or more memories 110, 120) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 110, 120 may store an operating system (OS) (e.g., Microsoft Windows, Linux, Unix, etc.) capable of facilitating the functionalities, apps, methods, or other software as discussed herein. The one or more memories 110 may also store the unsupervised anomaly detection module 128, the concatenation module 130, the supervised segmentation module 132, and/or the smart imaging application 116, each of which may be configured to enable machine vision job construction/execution, as described further herein. Additionally, or alternatively, the smart imaging application 116, the unsupervised anomaly detection module 128, the concatenation module 130, and/or the supervised segmentation module 132 may also be stored in the one or more memories 120 of the imaging device 104, and/or in an external database (not shown), which is accessible or otherwise communicatively coupled to the user computing device 102 via the network 106. The one or more memories 110, 120 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the smart imaging application 116, the unsupervised anomaly detection module 128, the concatenation module 130, and/or the supervised segmentation module 132, where each may be configured to facilitate their various functionalities discussed herein. It should be appreciated that one or more other applications may be envisioned and that are executed by the one or more processors 108, 118.

The one or more processors 108, 118 may be connected to the one or more memories 110, 120 via a computer bus responsible for transmitting electronic data, data packets, or otherwise electronic signals to and from the one or more processors 108, 118 and one or more memories 110, 120 in order to implement or perform the machine readable instructions, methods, processes, elements or limitations, as illustrated, depicted, or described for the various flowcharts, illustrations, diagrams, figures, and/or other disclosure herein.

The one or more processors 108, 118 may interface with the one or more memories 110, 120 via the computer bus to execute the operating system (OS). The one or more processors 108, 118 may also interface with the one or more memories 110, 120 via the computer bus to create, read, update, delete, or otherwise access or interact with the data stored in the one or more memories 110, 120 and/or external databases (e.g., a relational database, such as Oracle, DB2, MySQL, or a NoSQL based database, such as MongoDB). The data stored in the one or more memories 110, 120 and/or an external database may include all or part of any of the data or information described herein, including, for example, machine vision job images (e.g., images captured by the imaging device 104 in response to execution of a job script) and/or other suitable information.

The networking interfaces 112, 122 may be configured to communicate (e.g., send and receive) data via one or more external/network port(s) to one or more networks or local terminals, such as network 106, described herein. In some embodiments, networking interfaces 112, 122 may include a client-server platform technology such as ASP.NET, Java J2EE, Ruby on Rails, Node.js, a web service or online API, responsive for receiving and responding to electronic requests. The networking interfaces 112, 122 may implement the client-server platform technology that may interact, via the computer bus, with the one or more memories 110, 120 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 122 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, network 106 may comprise a private network or local area network (LAN). Additionally, or alternatively, network 106 may comprise a public network such as the Internet. In some embodiments, the network 106 may comprise routers, wireless switches, or other such wireless connection points communicating to the user computing device 102 (via the networking interface 112) and the imaging device 104 (via networking interface 122) via wireless communications based on any one or more of various wireless standards, including by non-limiting example, IEEE 802.11a/b/c/g (WIFI), the BLUETOOTH standard, or the like.

The I/O interfaces 114, 124 may include or implement operator interfaces configured to present information to an administrator or operator and/or receive inputs from the administrator or operator. An operator interface may provide a display screen (e.g., via the user computing device 102 and/or imaging device 104) which a user/operator may use to visualize any images, graphics, text, data, features, pixels, and/or other suitable visualizations or information. For example, the user computing device 102 and/or imaging device 104 may comprise, implement, have access to, render, or otherwise expose, at least in part, a graphical user interface (GUI) for displaying images, graphics, text, data, features, pixels, and/or other suitable visualizations or information on the display screen. The I/O interfaces 114, 124 may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the user computing device 102 and/or the imaging device 104. According to some embodiments, an administrator or user/operator may access the user computing device 102 and/or imaging device 104 to construct jobs, review images or other information, make changes, input responses and/or selections, and/or perform other functions.

As described above herein, in some embodiments, the user computing device 102 may perform the functionalities as discussed herein as part of a "cloud" network or may otherwise communicate with other hardware or software components within the cloud to send, retrieve, or otherwise analyze data or information described herein.

Figure 2A:
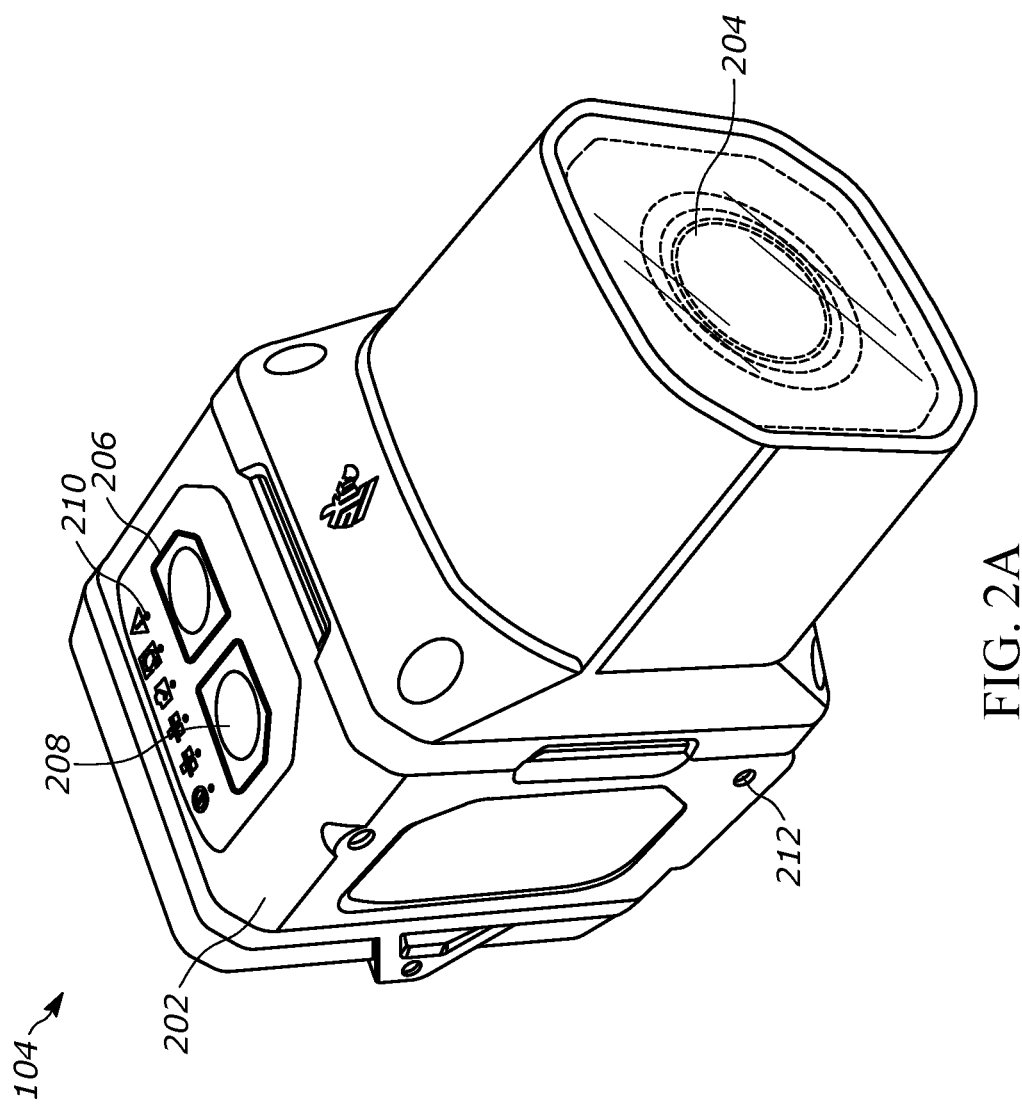
FIG. 2A is a perspective view of the imaging device of FIG. 1, in accordance with embodiments described herein.

FIG. 2A is a perspective view of the imaging device 104 of FIG. 1, in accordance with embodiments described herein. The imaging device 104 includes a housing 202, an imaging aperture 204, a user interface label 206, a dome switch/button 208, one or more light emitting diodes (LEDs) 210, and mounting point(s) 212. As previously mentioned, the imaging device 104 may obtain job files from a user computing device (e.g., user computing device 102) which the imaging device 104 thereafter interprets and executes. The instructions included in the job file may include device configuration settings (also referenced herein as "imaging settings") operable to adjust the configuration of the imaging device 104 prior to capturing images of a target object.

For example, the device configuration settings may include instructions to adjust one or more settings related to the imaging aperture 204. As an example, assume that at least a portion of the intended analysis corresponding to a machine vision job requires the imaging device 104 to maximize the brightness of any captured image. To accommodate this requirement, the job file may include device configuration settings to increase the aperture size of the imaging aperture 204. The imaging device 104 may interpret these instructions (e.g., via one or more processors 118) and accordingly increase the aperture size of the imaging aperture 204. Thus, the imaging device 104 may be configured to automatically adjust its own configuration to optimally conform to a particular machine vision job. Additionally, the imaging device 104 may include or otherwise be adaptable to include, for example but without limitation, one or more bandpass filters, one or more polarizers, one or more DPM diffusers, one or more C-mount lenses, and/or one or more C-mount liquid lenses over or otherwise influencing the received illumination through the imaging aperture 204.

The user interface label 206 may include the dome switch/button 208 and one or more LEDs 210, and may thereby enable a variety of interactive and/or indicative features. Generally, the user interface label 206 may enable a user to trigger and/or tune to the imaging device 104 (e.g., via the dome switch/button 208) and to recognize when one or more functions, errors, and/or other actions have been performed or taken place with respect to the imaging device 104 (e.g., via the one or more LEDs 210). For example, the trigger function of a dome switch/button (e.g., dome/switch button 208) may enable a user to capture an image using the imaging device 104 and/or to display a trigger configuration screen of a user application (e.g., smart imaging application 116). The trigger configuration screen may allow the user to configure one or more triggers for the imaging device 104 that may be stored in memory (e.g., one or more memories 110, 120) for use in later developed machine vision jobs, as discussed herein.

As another example, the tuning function of a dome switch/button (e.g., dome/switch button 208) may enable a user to automatically and/or manually adjust the configuration of the imaging device 104 in accordance with a preferred/predetermined configuration and/or to display an imaging configuration screen of a user application (e.g., smart imaging application 116). The imaging configuration screen may allow the user to configure one or more configurations of the imaging device 104 (e.g., aperture size, exposure length, etc.) that may be stored in memory (e.g., one or more memories 110, 120) for use in later developed machine vision jobs, as discussed herein.

To further this example, and as discussed further herein, a user may utilize the imaging configuration screen (or more generally, the smart imaging application 116) to establish two or more configurations of imaging settings for the imaging device 104. The user may then save these two or more configurations of imaging settings as part of a machine vision job that is then transmitted to the imaging device 104 in a job file containing one or more job scripts. The one or more job scripts may then instruct the imaging device 104 processors (e.g., one or more processors 118) to automatically and sequentially adjust the imaging settings of the imaging device in accordance with one or more of the two or more configurations of imaging settings after each successive image capture.

The mounting point(s) 212 may enable a user connecting and/or removably affixing the imaging device 104 to a mounting device (e.g., imaging tripod, camera mount, etc.), a structural surface (e.g., a warehouse wall, a warehouse ceiling, structural support beam, etc.), other accessory items, and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through the imaging device's 104 FOV. Moreover, the mounting point(s) 212 may enable a user to connect the imaging device 104 to a myriad of accessory items including, but without limitation, one or more external illumination devices, one or more mounting devices/brackets, and the like.

In addition, the imaging device 104 may include several hardware components contained within the housing 202 that enable connectivity to a computer network (e.g., network 106). For example, the imaging device 104 may include a networking interface (e.g., networking interface 122) that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Ethernet/IP, PROFINET, Modbus TCP, CC-Link, USB 3.0, RS-232, and/or any other suitable communication protocol or combinations thereof.

Figure 2B:
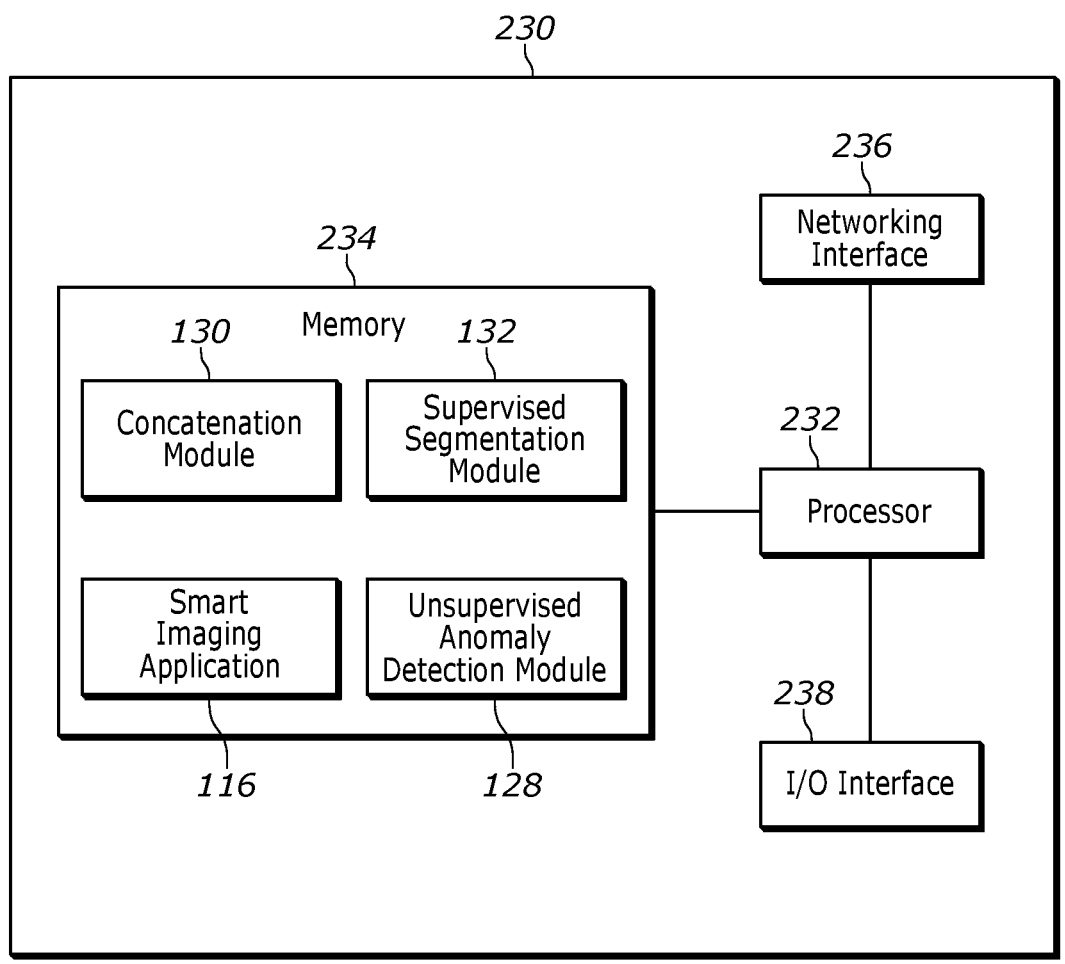
FIG. 2B is a block diagram of an example logic circuit for implementing example methods and/or operations described herein.

FIG. 2B is a block diagram representative of an example logic circuit capable of implementing, for example, one or more components of the example user computing device 102 of FIG. 1. The example logic circuit of FIG. 2B is a processing platform 230 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 230 of FIG. 2B includes a processor 232 such as, for example, one or more microprocessors, controllers, and/or any suitable type of processor. The example processing platform 230 of FIG. 2B includes memory (e.g., volatile memory, non-volatile memory) 234 accessible by the processor 232 (e.g., via a memory controller). The example processor 232 interacts with the memory 234 to obtain, for example, machine-readable instructions stored in the memory 234 corresponding to, for example, the operations represented by the flowcharts of this disclosure. The memory 234 also includes the smart imaging application 116, the unsupervised anomaly detection module 128, the concatenation module 130, and the supervised segmentation module 132 that are each accessible by the example processor 232. The smart imaging application 116, the unsupervised anomaly detection module 128, the concatenation module 130, and the supervised segmentation module 132 may comprise rule-based instructions, an artificial intelligence (AI) and/or machine learning-based model, and/or any other suitable algorithm architecture or combination thereof configured to, for example, perform precise anomaly localization within content captured by a machine vision camera (e.g., imaging device 104). To illustrate, the example processor 232 may access the memory 234 to execute the smart imaging application 116 the unsupervised anomaly detection module 128, the concatenation module 130, and/or the supervised segmentation module 132 when the imaging device 104 (via the imaging assembly 126) captures an image that includes a target object with a localized anomaly. Additionally, or alternatively, machine-readable instructions corresponding to the example operations described herein may be stored on one or more removable media (e.g., a compact disc, a digital versatile disc, removable flash memory, etc.) that may be coupled to the processing platform 230 to provide access to the machine-readable instructions stored thereon.

The example processing platform 230 of FIG. 2B also includes a networking interface 236 to enable communication with other machines via, for example, one or more networks. The example networking interface 236 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example processing platform 230 of FIG. 2B also includes input/output (I/O) interfaces 238 to enable receipt of user input and communication of output data to the user. Such user input and communication may include, for example, any number of keyboards, mice, USB drives, optical drives, screens, touchscreens, etc.

Figure 3A:
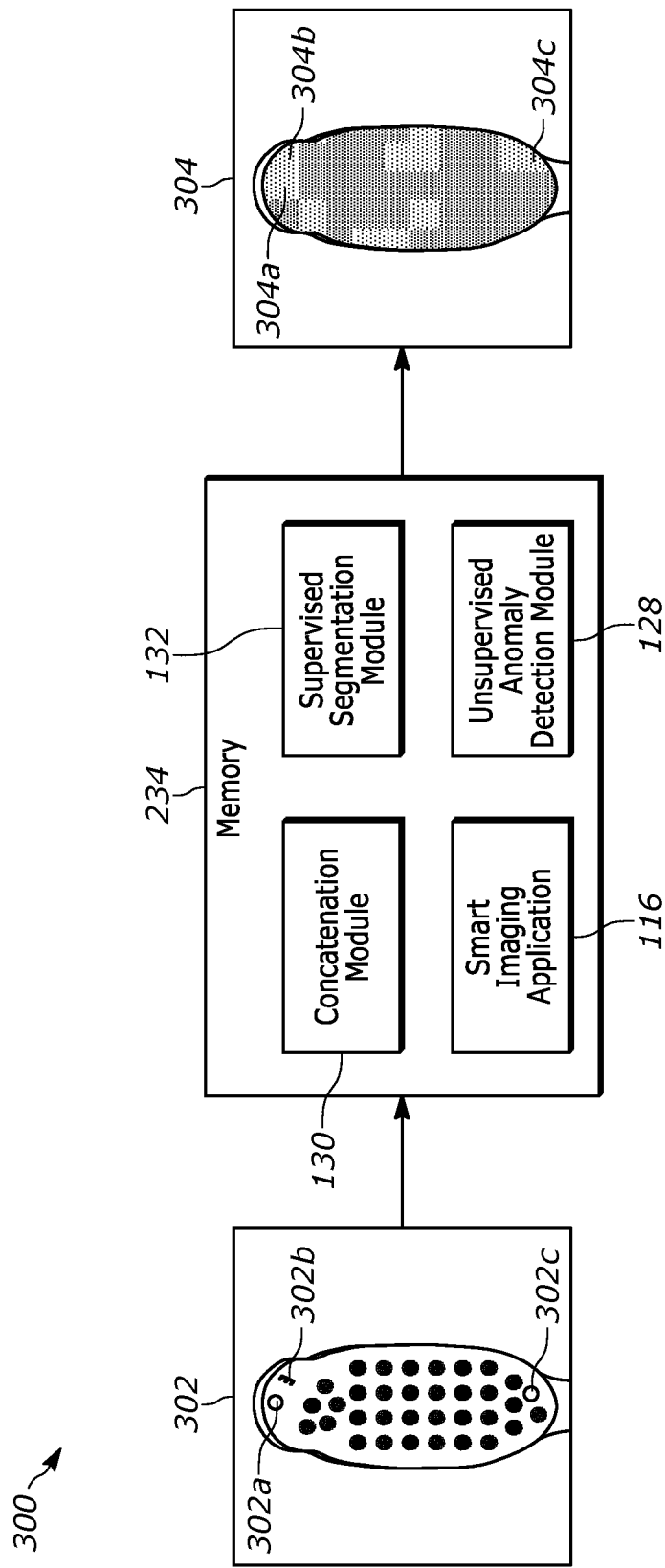
FIG. 3A depicts an example anomaly heatmap generation by the unsupervised anomaly detection module of FIGS. 1 and 2B, in accordance with embodiments of the present disclosure.

FIG. 3A depicts an example anomaly heatmap generation 300 by the unsupervised anomaly detection (UAD) module 128 of FIGS. 1 and 2B, in accordance with embodiments herein. Generally, an imaging device (e.g., imaging device 104) may capture an input image 302 featuring a target object with a localized anomaly (e.g., a toothbrush with several missing bristles 302a, 302b, 302c), and a user computing device (e.g., user computing device 102) may receive the input image 302 from the imaging device 104 in order to generate an anomaly heatmap 304. Of course, in certain embodiments, the imaging device 104 may capture the input image 302 and automatically generate the anomaly heatmap 304.

In any event, the user computing device 102 may generate the anomaly heatmap 304 by applying the UAD module 128 to the input image 302. Specifically, the UAD module 128 may include an unsupervised machine learning model that is configured to apply image reconstruction techniques to an input image (e.g., input image 302) and output a heatmap (e.g., the anomaly heatmap 304) as a result of the training performed using the plurality of training images. The anomaly heatmap 304 includes various shadings representative of predicted anomaly locations, wherein more pronounced shadings (e.g., higher contrast portions of the anomaly heatmap 304) indicate likely locations of anomalies, such as anomaly heatmap portions 304a, 304b, and 304c.

The unsupervised machine learning model that is included as part of the UAD module 128 may be trained with a plurality of training images that each include a training target object with no localized anomalies. In this manner, the UAD module 128 may accurately and efficiently generate heatmaps that identify localized anomalies because the unsupervised machine learning model is trained using the plurality of training images that each include non-defective representations of target objects (e.g., a toothbrush with no missing bristles).

Generally, machine learning may involve identifying and recognizing patterns in existing data (such as generating anomaly heatmaps and hybrid output masks identifying localized anomalies within training images featuring target objects) in order to facilitate making predictions or identification for subsequent data (such as using the model on a new image featuring a target object in order to determine or generate an anomaly heatmap and a hybrid output mask identifying one or more localized anomalies within the new image featuring the target object). Machine learning model (s), such as the AI based learning models (e.g., included as part of the UAD module 128 and the SS module 132) described herein for some aspects, may be created and trained based upon example data (e.g., "training data") inputs or data (which may be termed "features" and "labels") in order to make valid and reliable predictions for new inputs, such as testing level or production level data or inputs.

More specifically, the unsupervised machine learning model included as part of the UAD module 128, may be trained using one or more unsupervised machine learning techniques. In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated.

In certain aspects, the unsupervised machine learning model included as part of the unsupervised anomaly detection module 128 may employ a convolutional autoencoder. However, it should be understood that the unsupervised machine learning model included as part of the unsupervised anomaly detection module 128 may be comprised of any suitable unsupervised machine learning model, such as a neural network, which may be a deep belief network, Hebbian learning, or the like, as well as method of moments, principal component analysis, independent component analysis, isolation forest, any suitable clustering model, and/or any suitable combination thereof.

Regardless, training the AI based learning models (e.g., included as part of the UAD module 128 and the SS module 132) described herein may also comprise retraining, relearning, or otherwise updating models with new, or different, information, which may include information received, ingested, generated, or otherwise used over time. Moreover, in various aspects, the AI based learning models (e.g., included as part of the UAD module 128 and the SS module 132) may be trained, by one or more processors (e.g., one or more processor(s) 108 of user computing device 102 and/or processors 118 of the imaging device 104) with the pixel data of a plurality of training images each including target objects.

Figure 3B:
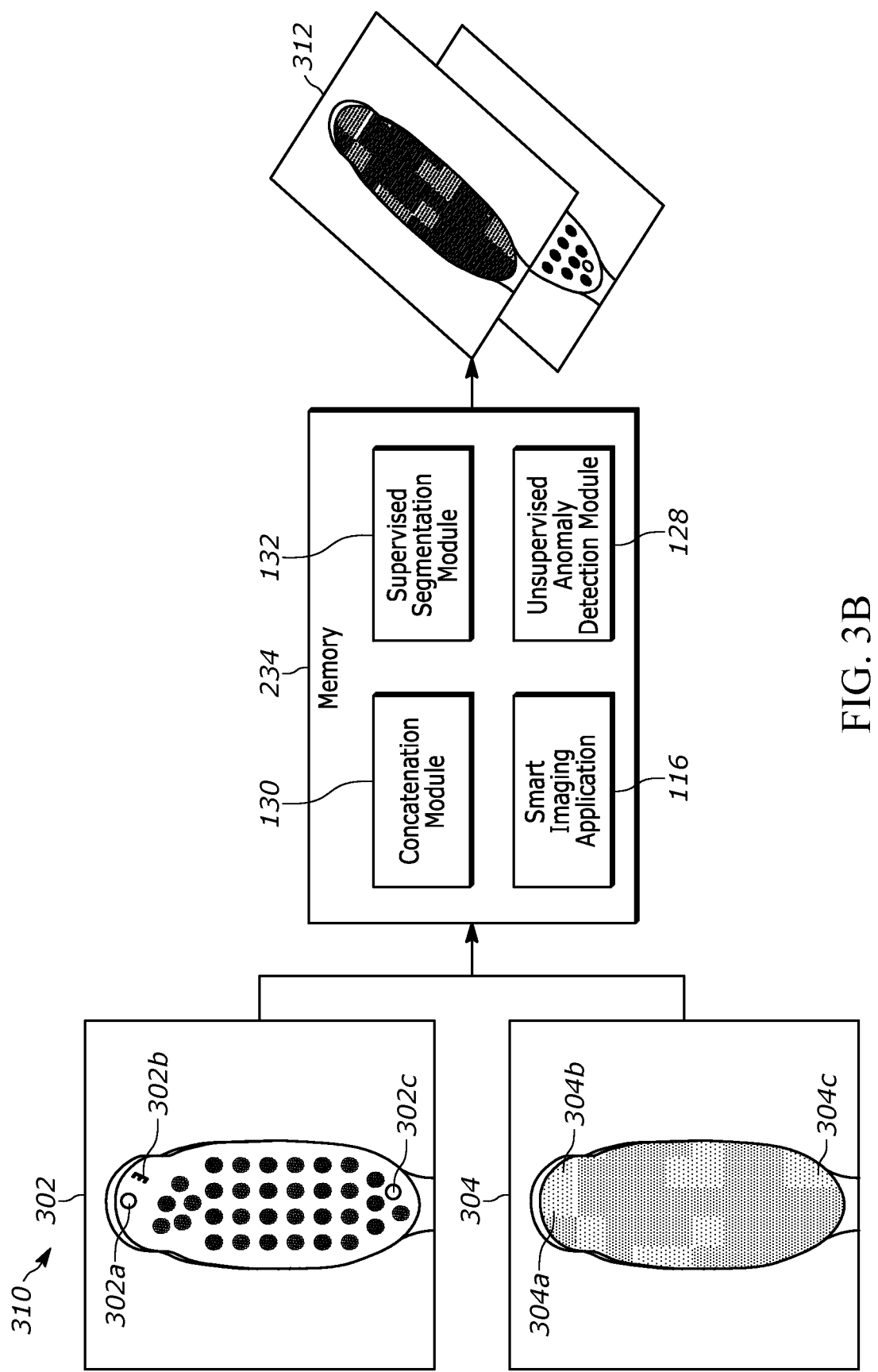
FIG. 3B depicts an example multi-channel image concatenation by the concatenation module of FIGS. 1 and 2B, in accordance with embodiments of the present disclosure.

FIG. 3B depicts an example multi-channel image concatenation 310 by the concatenation module 130 of FIGS. 1 and 2B, in accordance with embodiments of the present disclosure. Generally, the concatenation module 130 may receive the input image 302 from an imaging device (e.g., imaging device 104), or as stored in memory 234, and the anomaly heatmap 304 from the UAD module 128 in order to generate a multi-channel image 312. Of course, in certain embodiments, the imaging device 104 may capture the input image 302 and automatically generate the anomaly heatmap 304 and the multi-channel image 312.

In any event, the concatenation module 130 may generate the multi-channel image 312 by concatenating the input image 302 with the anomaly heatmap 304. Specifically, in certain aspects, the concatenation module 130 may stack the single-channel anomaly heatmap 304 and the original three-channel input image 302 (e.g., a red-green-blue (RGB) image) in order to output a four-channel image (referenced herein as an "RGBH image" or "RGB+H image").

Figure 3C:
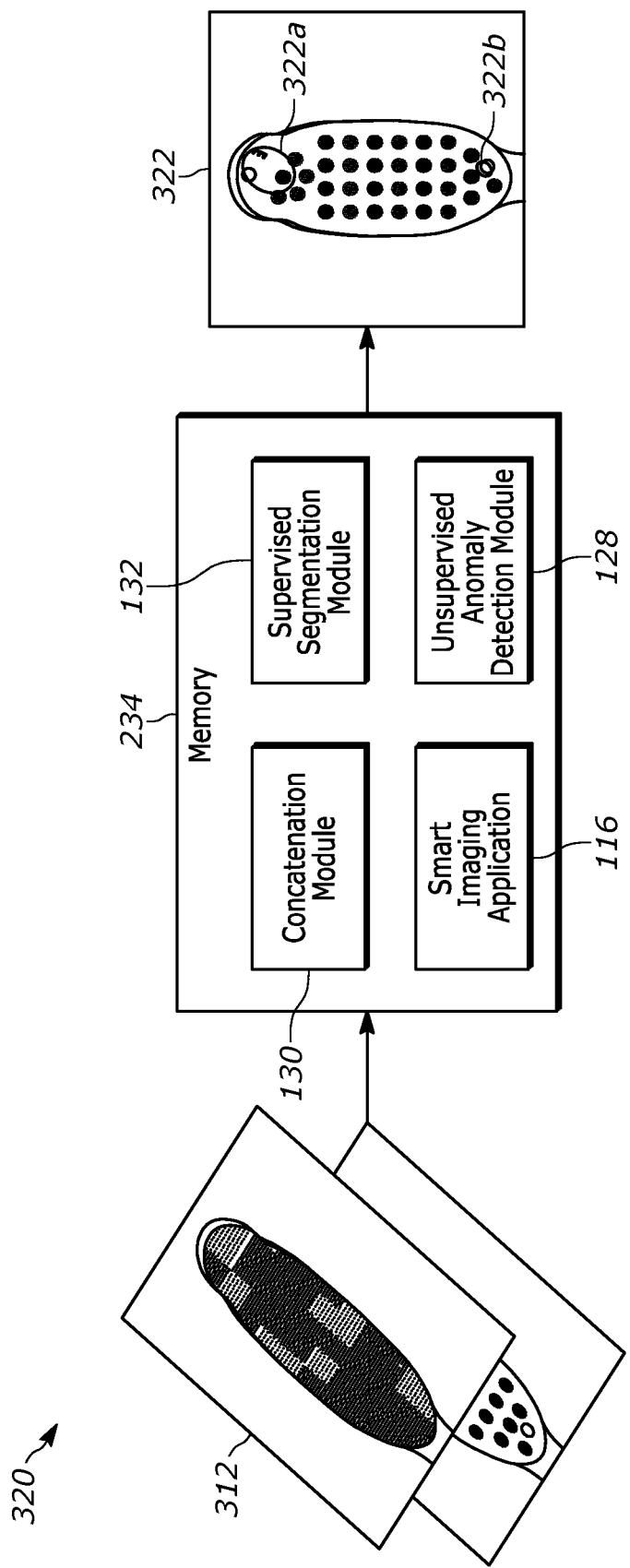
FIG. 3C depicts an example hybrid output mask generation by the supervised segmentation module of FIGS. 1 and 2B, in accordance with embodiments of the present disclosure.

Thereafter, the SS module 132 may proceed to generate a hybrid output mask based on the multi-channel image 312. For example, FIG. 3C depicts an example hybrid output mask generation 320 by the supervised segmentation module 132 of FIGS. 1 and 2B, in accordance with embodiments of the present disclosure. As shown in FIG. 3C, the SS module 132 may receive the multi-channel image 312 as input, and may output a hybrid output mask 322 that includes localized anomaly regions 322a, 322b that identify localized anomalies within the original input image 302. Of course, in certain embodiments, the imaging device 104 may capture the input image 302 and automatically generate the multi-channel image 312 and the hybrid output mask 322.

The supervised machine learning model that is included as part of the SS module 132 may be trained with a plurality of training images and corresponding ground truth binary masks. Specifically, the supervised machine learning model may be configured to receive an input image (e.g., multi-channel image 312) and output a hybrid output mask (e.g., hybrid output mask 322) as a result of the training performed using the plurality of training images and corresponding ground truth binary masks. The output of the supervised machine learning model during the training process may be compared with the corresponding ground truth binary masks. In this manner, the SS module 132 may accurately and consistently generate hybrid output masks that identify localized anomalies because the differences between the hybrid output masks and the corresponding ground truth binary masks may be used to modify/adjust and/or otherwise inform the weights/values of the supervised machine learning model (e.g., an error function).

As previously mentioned, machine learning may generally involve identifying and recognizing patterns in existing data (such as generating anomaly heatmaps and hybrid output masks identifying localized anomalies within training images featuring target objects) in order to facilitate making predictions or identification for subsequent data (such as using the model on a new image featuring a target object in order to determine or generate an anomaly heatmap and a hybrid output mask identifying one or more localized anomalies within the new image featuring the target object).

More specifically, the supervised machine learning model included as part of the SS module 132, may be trained using one or more supervised machine learning techniques. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

For example, in certain aspects, the supervised machine learning model may employ a neural network, which may be a convolutional neural network (CNN), a deep learning neural network, or a combined learning module or program that learns in two or more features or feature datasets (e.g., user-specific data) in particular areas of interest. The machine learning programs or algorithms may also include natural language processing, semantic analysis, automatic reasoning, support vector machine (SVM) analysis, decision tree analysis, random forest analysis, K-Nearest neighbor analysis, naïve Bayes analysis, clustering, reinforcement learning, and/or other machine learning algorithms and/or techniques. In some aspects, the artificial intelligence and/or machine learning based algorithms may be included as a library or package executed on the server(s) 102. For example, libraries may include the TENSORFLOW based library, the PYTORCH library, and/or the SCIKIT-LEARN Python library.

Figure 3D:
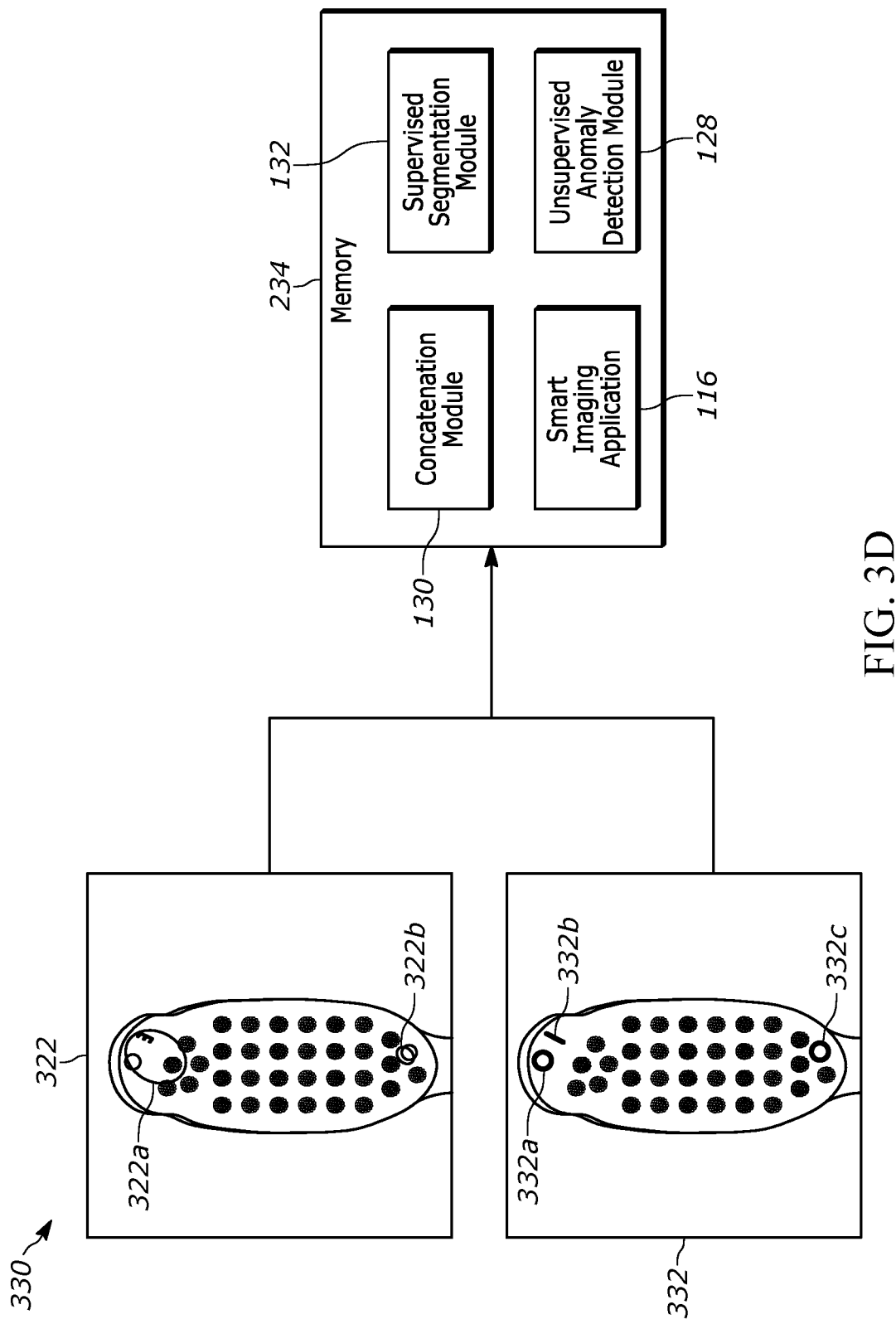
FIG. 3D depicts an example hybrid model training based on the example hybrid output mask of FIG. 3C and an example ground truth mask, in accordance with embodiments of the present disclosure.

To illustrate, FIG. 3D depicts an example hybrid model training 330 based on the example hybrid output mask 332 of FIG. 3C and an example ground truth mask 332, in accordance with embodiments of the present disclosure. The example hybrid model training 330 may depict a training process used to train, for example, the supervised machine learning model included as part of the SS module 132. Generally, the example hybrid model training 330 includes comparing the localized anomaly regions 322a, 322b of the hybrid output mask 322 with the training localized anomaly regions 332a, 332b, 332c of the example ground truth mask 332.

In certain embodiments, the smart imaging application 116 may execute code stored on the memory 234 defining a training procedure corresponding to the supervised machine learning model of the SS module 132, wherein the processors (e.g., processors 108) analyze the differences between the regions of the respective images (e.g., 322, 332) covered by the corresponding respective anomaly regions (322a-b, 332a-c). For example, the processors may determine a percentage of the training localized anomaly regions 332a,

332b, 332c that are included within the localized anomaly regions 322a, 322b. As another example, the processors may determine a percentage/pixel count corresponding to the localized anomaly regions 322a, 322b that is not included as part of any of the training localized anomaly regions 332a, 332b, 332c. In any event, the processors may determine any suitable numerical value (e.g., percentage, ratio, integer, etc.) that represents the difference between the regions of the respective images (e.g., 322, 332) covered by the corresponding respective anomaly regions (322a-b, 332a-c), and may additionally determine how to adjust/refine the weights or other metrics of the supervised machine learning model in order to more accurately identify localized anomalies in subsequent iterations of the supervised machine learning model.

It should be understood that, while described herein as being trained using a supervised/unsupervised learning technique, in certain aspects, the AI based learning models described herein may be trained using multiple supervised/unsupervised machine learning techniques. Moreover, it should be appreciated that the anomaly heatmap and hybrid output mask generations may be performed by a supervised/unsupervised machine learning model and/or any other suitable type of machine learning model or combinations thereof.

Figure 4:
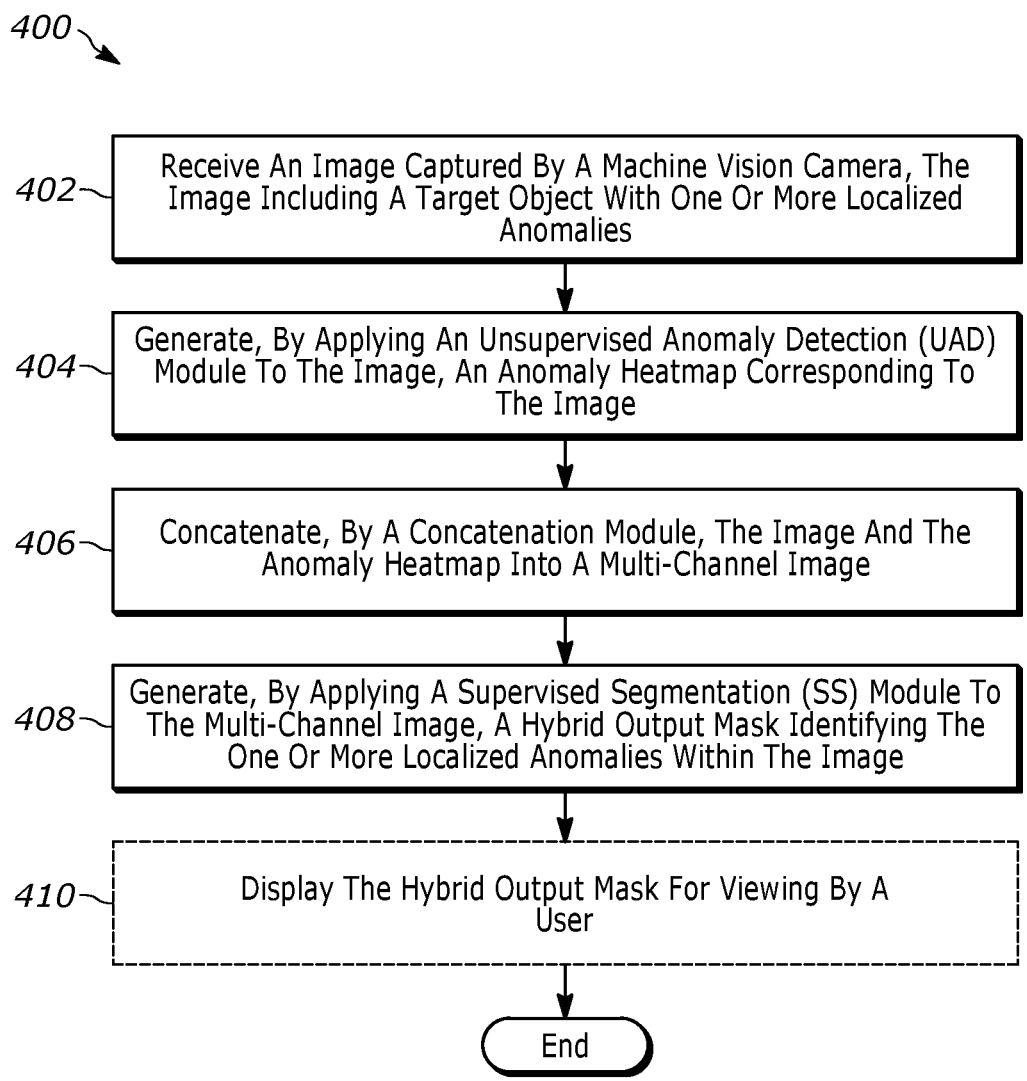
FIG. 4 is a flowchart representative of a method for anomaly localization within content captured by a machine vision camera, in accordance with embodiments described herein.

FIG. 4 is a flowchart representative of a method 400 for anomaly localization within content captured by a machine vision camera, in accordance with embodiments described herein. Each block described herein may be optional in certain embodiments. Further, while the actions included as part of the method 400 are described herein as being executed and/or otherwise performed by one or more processors 108, it is to be understood that each of the actions included as part of the method 400 may be performed by any suitable processor (e.g., processors 118).

The method 400 includes receiving an image (e.g., input image 302) captured by the machine vision camera (block 402). The image may be received at an application executing on a user computing device communicatively coupled to a machine vision camera, and the image may include a target object with one or more localized anomalies.

The method 400 may also include generating an anomaly heatmap (e.g., anomaly heatmap 304) corresponding to the image (block 404). One or more processors (e.g., processors 108) may generate the anomaly heatmap by applying an unsupervised anomaly detection (UAD) module (e.g., UAD module 128) to the image. Specifically, the UAD module 128 may include an unsupervised machine learning model that may receive the image as input, and may output the anomaly heatmap.

In certain embodiments, the UAD module 128 includes an unsupervised machine learning model that is trained with a plurality of training images that each include a training target object with no localized anomalies. For example, the unsupervised learning model included as part of the UAD module 128 may be a convolutional autoencoder trained to utilize image reconstruction techniques on each of the plurality of training images to generate a corresponding plurality of training anomaly heatmaps.

The method 400 may also include concatenating the input image and the anomaly heatmap into a multi-channel image (block 406). The concatenation module 130, for example, may receive the input image and the anomaly heatmap from the UAD module 128 to generate the multi-channel image. In certain embodiments, the input image (e.g., input image 302) is a red-green-blue (RGB) image, and the anomaly heatmap (e.g., anomaly heatmap 304) is a single channel image. In these embodiments, the concatenation module 130 may concatenate the input image and the anomaly heatmap into a four-channel image (e.g., the multi-channel image 312).

The method 400 may also include generating a hybrid output mask identifying the one or more localized anomalies within the image (e.g., input image 302) (block 408). The SS module 132 may generate the hybrid output mask after receiving the multi-channel image as input. In certain embodiments, the SS module 132 includes a supervised machine learning model that is trained with (i) a plurality of multi-channel images and (ii) a plurality of ground-truth binary masks. In these embodiments, each respective ground-truth binary mask may correspond to a respective multi-channel image. Moreover, in certain embodiments, the supervised machine learning model may include a convolutional neural network (CNN).

The method 400 may also include displaying the hybrid output mask on a user interface for viewing by a user (block 410). For example, a user computing device (e.g., user computing device 102) may display the hybrid output mask on a user interface (e.g., via I/O interface 114) for a user to view the hybrid output mask. Moreover, the user computing device may render selectable options for a user to, for example, open the smart imaging application 116 to initiate a training sequence of the machine learning models described herein based on the hybrid output mask and/or other outputs (e.g., anomaly heatmap, multi-channel image), adjust imaging settings of the imaging device 104, halt a manufacturing process so the owner/operator may address the issues represented in the hybrid output mask, and/or other suitable actions or combinations thereof.

Additional Considerations

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for anomaly localization within content captured by a machine vision camera, the method comprising:
   receiving, at an application executed on a user computing device communicatively coupled to the machine vision camera, an image captured by the machine vision camera, the image including a target object with one or more localized anomalies;
   generating, by applying an unsupervised anomaly detection (UAD) module to the image, an anomaly heatmap corresponding to the image;
   concatenating, by a concatenation module, the image and the anomaly heatmap into a multi-channel image; and
   generating, by applying a supervised segmentation (SS) module to the multi-channel image, a hybrid output mask identifying the one or more localized anomalies within the image.

2. The method of claim 1, wherein the UAD module includes an unsupervised machine learning model that is trained with a plurality of training images each including a training target object with no localized anomalies.

3. The method of claim 2, wherein the unsupervised machine learning model includes a convolutional autoencoder.

4. The method of claim 1, wherein the image is a red-green-blue (RGB) image, the anomaly heatmap is a single channel image, and wherein concatenating the image and the anomaly heatmap further comprises:
concatenating, by the concatenation module, the image and the anomaly heatmap into a 4-channel image.

5. The method of claim 1, wherein the SS module includes a supervised machine learning model that is trained with (i) a plurality of multi-channel images and (ii) a plurality of ground-truth binary masks, wherein each respective ground-truth binary mask corresponds to a respective multi-channel image.

6. The method of claim 5, wherein the supervised machine learning model includes a convolutional neural network (CNN).

7. The method of claim 1, further comprising:
displaying, on a user interface, the hybrid output mask for viewing by a user.

8. A machine vision system for anomaly localization within content captured by a machine vision camera, the system comprising:
the machine vision camera configured to capture an image including a target object with one or more localized anomalies; and
a user computing device executing an application, wherein the user computing device is communicatively coupled to the machine vision camera and is configured to:
receive the image captured by the machine vision camera,
generate, by applying an unsupervised anomaly detection (UAD) module to the image, an anomaly heatmap corresponding to the image,
concatenate, by a concatenation module, the image and the anomaly heatmap into a multi-channel image, and
generate, by applying a supervised segmentation (SS) module to the multi-channel image, a hybrid output mask identifying the one or more localized anomalies within the image.

9. The machine vision system of claim 8, wherein the UAD module includes an unsupervised machine learning model that is trained with a plurality of training images each including a training target object with no localized anomalies.

10. The machine vision system of claim 9, wherein the unsupervised machine learning model includes a convolutional autoencoder.

11. The machine vision system of claim 8, wherein the image is a red-green-blue (RGB) image, the anomaly heatmap is a single channel image, and wherein the user computing device is further configured to:
concatenate, by the concatenation module, the image and the anomaly heatmap into a 4-channel image.

12. The machine vision system of claim 8, wherein the SS module includes a supervised machine learning model that is trained with (i) a plurality of multi-channel images and (ii) a plurality of ground-truth binary masks, wherein each respective ground-truth binary mask corresponds to a respective multi-channel image.

13. The machine vision system of claim 12, wherein the supervised machine learning model includes a convolutional neural network (CNN).

14. The machine vision system of claim 8, wherein the user computing device is further configured to:
display, on a user interface, the hybrid output mask for viewing by a user.

15. A tangible machine-readable medium comprising instructions that, when executed, cause a machine to at least:
receive, an image captured by a machine vision camera, the image including a target object with one or more localized anomalies;
generate, by applying an unsupervised anomaly detection (UAD) module to the image, an anomaly heatmap corresponding to the image;
concatenate, by a concatenation module, the image and the anomaly heatmap into a multi-channel image; and
generate, by applying a supervised segmentation (SS) module to the multi-channel image, a hybrid output mask identifying the one or more localized anomalies within the image.

16. The tangible machine-readable medium of claim 15, wherein the UAD module includes an unsupervised machine learning model that is trained with a plurality of training images each including a training target object with no localized anomalies.

17. The tangible machine-readable medium of claim 16, wherein the unsupervised machine learning model includes a convolutional autoencoder.

18. The tangible machine-readable medium of claim 15, wherein the image is a red-green-blue (RGB) image, the anomaly heatmap is a single channel image, and wherein the instructions, when executed, further cause the machine to at least:
concatenate, by the concatenation module, the image and the anomaly heatmap into a 4-channel image.

19. The tangible machine-readable medium of claim 15, wherein the SS module includes a supervised machine learning model that is trained with (i) a plurality of multi-channel images and (ii) a plurality of ground-truth binary masks, wherein each respective ground-truth binary mask corresponds to a respective multi-channel image.

20. The tangible machine-readable medium of claim 19, wherein the supervised machine learning model includes a convolutional neural network (CNN).

* * * * *